Figure 1:
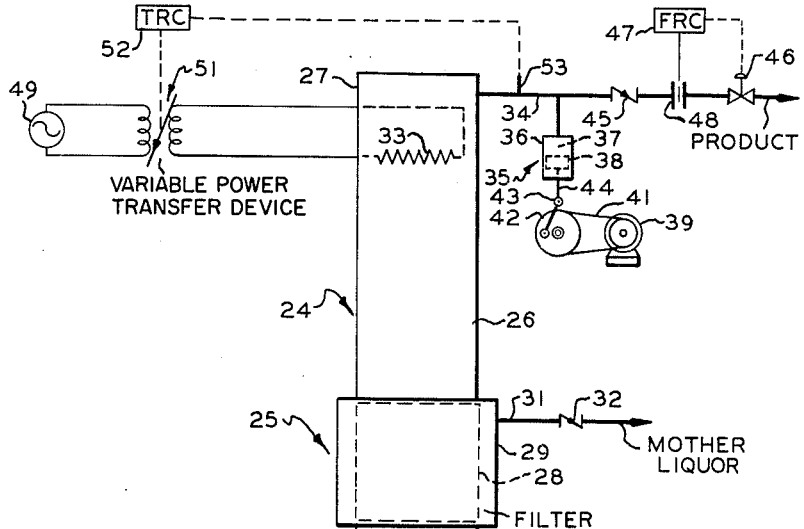
Figure 1:
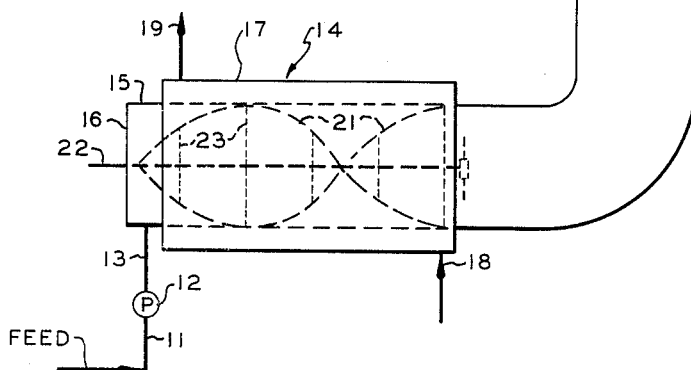

Oct. 19, 1965   F. L. STOLLER   3,212,282
FRACTIONAL CRYSTALLIZATION CONTROL SYSTEM
Filed July 2, 1962

INVENTOR.
FREDERICK L. STOLLER
BY Young & Quigg
ATTORNEYS

United States Patent Office 3,212,282
Patented Oct. 19, 1965

3,212,282
FRACTIONAL CRYSTALLIZATION CONTROL SYSTEM
Frederick L. Stoller, Bartlesville, Okla., assignor to Phillips Petroleum Company, a corporation of Delaware
Filed July 2, 1962, Ser. No. 206,846
9 Claims. (Cl. 62—58)

This invention relates to method and apparatus for separating the components of a fluid mixture by means of fractional crystallization. In one aspect the invention relates to method and means for concentrating an aqueous solution with concomitant production of water separated from the solution. In another aspect the invention relates to the recovery of fresh water from sea water. In yet another aspect the invention relates to the concentration of aqueous solutions and dispersions such as orange juice, beer, milk and the like.

Purification by means of fractional crystallization has been known for a number of years. Schmidt Re. 23,810 (1954) discloses a process and apparatus for purifying crystals, which process involves moving a mixture of crystals and adhering liquid through a liquid removal zone, a reflux zone and a melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture thereof with the other xylene isomers and ethyl benzene.

Previously the crystals have been melted by the application of heat to the melting section of the purification column by means of a suitable heating element, such as a heat exchange coil or an electrical heater, disposed inside the melting section and in contact with the melt or disposed outside the melting section and in heat exchanging relationship therewith, or by means for effecting direct heat exchange between a suitable fluid, such as warm butane, and the contents of the melting section. In general the prior art systems maintained the rate of introduction of heat into the melting section at a substantially constant value and permitted the purified product withdrawal rate to vary. However, in order to obtain and maintain optimum production of purified product it has become desirable to withdraw the purified product at a substantially constant rate. Difficulties have been encountered in maintaining the desired constant withdrawal rate of purified product due to various fluctuations within the system such as channeling of melt liquid through a void in the crystal bed.

In accordance with the invention it has been discovered that these difficulties can be substantially reduced, if not eliminated, and the desired constant rate of withdrawal of purified product can be maintained by controlling the addition of heat to the contents of the melting section responsive to the temperature of the melt although the reason for this is not presently understood.

Accordingly, it is an object of the invention to provide an improved method and apparatus for effecting the separation of components of a mixture. Another object of the invention is to provide method and means for obtaining optimum production of purified product. A further object of the invention is the provision of method and means for maintaining a substantially constant rate of withdrawal of purified product. A still further object of the invention is to maintain the temperature of the melt from a crystal purification column substantially constant.

Other objects, aspects and advantages of the invention will be apparent from a study of the disclosure, the drawings and the appended claims to the invention.

Figure 2:
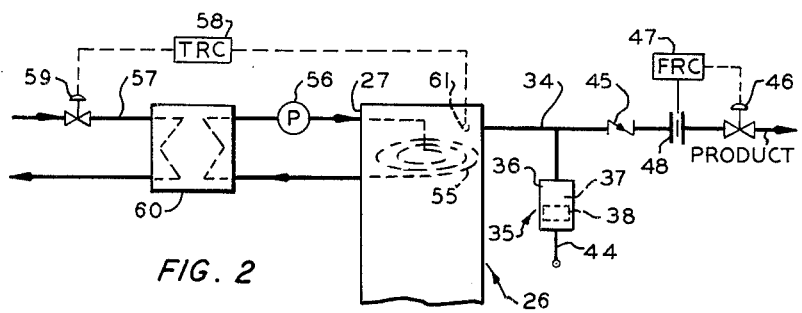

In the drawings FIGURE 1 is a schematic representation of a crystal purification system in accordance with the invention, and FIGURE 2 is a modification of the system of FIGURE 1.

Referring now to FIGURE 1 in detail, a feed mixture comprising two or more components, one of which is separable from the mixture by crystallization, is passed through conduit 11 and is forced by means of pump 12 through conduit 13 into chilling section 14. Chilling section 14 comprises an inner cylindrical shell 15 one end of which is closed by means of an end member 16, and a cooling jacket 17 having an inlet 18 and an outlet 19. Agitating or scraping means 21 are positioned within cylindrical shell 15 and are designed to prevent the accumulation of solid material on the inner surface of cylindrical shell 15. Scraping means 21 can be constructed of strips of metal or other suitable material known in the art and can be fabricated in the form of a helix, as shown in the drawing, or can be straight. Any suitable form of scraping means 21 can be provided. Scraping means 21 are mounted on a rotatable shaft 22 by means of members 23. Shaft 22 is axially positioned within cylindrical shell 15 and is connected to any suitable source of power which rotates the scraping means, such power source not being shown in the drawing. Shaft 22 is suitably sealed in end member 16 by means of a packing gland of any desired type known in the art. Cooling of the feed which enters chilling section 14 can be provided by passing a suitable coolant through inlet 18 and withdrawing the coolant through outlet 19. Sufficient cooling in chilling section 14 is provided so that a predetermined amount of solid crystals is produced from the feed passing therethrough. The resulting slurry of crystals in mother liquor is passed into purification column 24 which comprises filtration section 25, reflux section 26, and melting section 27. Filtration section 25 comprises a suitable filter screen or medium 28 and an external shell 29, the latter being provided with an outlet pipe 31 through which the filtrate, that is the mother liquor, is passed. Filter medium 28 can be of any desired type known in the art. For example it can comprise a metallic screen, a sintered perforate metal member or a perforate metal member supporting a filter cloth. It is desirable that the filter member 28 be positioned integrally with respect to adjacent walls of reflux section 26. Although filtration section 25 has been illustrated in the drawing as being an external filter, it is within the scope of the invention to utilize an internal filter, in which event, external shell 29 could be positioned integrally with respect to the wall of reflux section 26, and filter medium 28 would be disposed within shell 29 and preferably positioned axially with respect to purification column 24. The filtrate produced in filtration section 25 is removed from purification column 24 through conduit 31. Conduit 31 can contain a suitable means, such as pressure reducing valve 32, to maintain a predetermined back pressure. The remaining crystal mass is passed into reflux section 26 wherein it is countercurrently contacted with liquid reflux as subsequently described. As the crystal mass approaches heating element 33 in melting section 27, the crystals are melted. A portion of the melt produced by the heat from heating element 33 is withdrawn through product withdrawal conduit 34 as a purified product of the process. The remainder of the melt is forced back through reflux section 26 to form reflux which effects crystal purification.

The pulsation-producing means 35 comprises a cylinder 36, one end of which is in fluid communication with the purified product withdrawal line 34, and reciprocable piston 37 mounted within cylinder 36. Piston 37 is suitably sealed in cylinder 36, for example by means of rings 38, to prevent leakage of the purified product. Reciprocation of piston 37 is produced by any suitable means, for example by an electrical motor 39, a belt 41, a crank means 42, and connecting rods 43 and 44. While the crystal mass is being advanced from chilling section 14 through filtration section 25 and reflux section 26 into melting section 27, piston 37 is reciprocated at a suitable rate, such as in the range of about 50 to about 400 pulsations per minute, so that a pulsating pressure is exerted on the melt reflux which is intermittently forced back, countercurrently with respect to the crystal mass through reflux section 26. A check valve 45 can be provided in product withdrawal line 34 to prevent the back flow of withdrawn product into the crystal purification column 24. If desired, check valve 45 can be replaced or augmented by a suitable valve, such as a solenoid valve, which is cyclically opened and closed in synchronism with the movement of piston 37. The rate of withdrawal of purified product in conduit 34 is set for a substantially constant rate by means of valve 46 which is actuated by flow rate controller 47 responsive to the pressure drop across an orifice 48 in conduit 34.

Electrical power is transmitted to electrical heating element 33 from electrical power source 49 by means of a suitable variable power transferring device, such as a servo motor rotated Powerstat 51. The position of Powerstat 51 is controlled by temperature recorder-controller 52 responsive to the temperature of the melt passing through conduit 34 as determined by temperature sensing device 53, which can suitably be a thermocouple.

Referring now to FIGURE 2 there is illustrated a modification of FIGURE 1 wherein the heating means for melting section 27 is a heat exchange coil 55, through which a suitable heating fluid is passed. In a presently preferred embodiment water is utilized as the heating fluid which is passed through heat exchange coil 55 by means of pump 56, the water being heated by being passed through heat exchanger 60 in heat exchanging relationship with steam in line 57. A temperature recorder-controller 58 regulates valve 59, which is located in conduit 57, to control the rate of flow of steam through conduit 57 responsive to the temperature of the melt in melting section 27 as measured by temperature sensing means 61. While a duplex heating fluid system is presently preferred for ease and accuracy of control, it is within the contemplation of the invention to utilize only one heating fluid in which case the rate of flow of the heating fluid to heat exchange coil 55 can be regulated by temperature recorder-controller 58 responsive to the temperature of the melt. Although the invention has been illustrated through the utilization of internal heating elements 33 and 55, it is within the contemplation of the invention to utilize an external heater, for example, a heating jacket encompassing melting section 27. Such a heating jacket can be provided with any suitable means for heating, such as an electrical heater or a fluid heat exchanging means. Still further, while the invention has been illustrated as utilizing indirect heat exchange means for the heat source for melting section 27 it is within the contemplation of the invention to utilize direct heat exchanging means, such as the injection of a suitable fluid, for example warmed purified product or a warm refrigerant such as butane. In such cases the rate of introduction of the direct heat exchanging fluid can be controlled responsive to the temperature of the melt in melting section 24, or the temperature of the fluid can be manipulated in response to the melt temperature.

A crystallization purification system which utilizes the control system of the present invention can operate with the purified product withdrawal rate being substantially constant at the optimum value through the utilization of the means for varying the heat input to the melting section of the purification column responsive to the temperature of the melt. The theory for this phenomenon is not presently understood. The temperature of the melt can be measured either in the melting section itself or in the product withdrawal line.

While the invention has been illustrated utilizing an indirect heat exchanging chiller section, it is within the contemplation of the invention to utilize direct heat exchange between a suitable refrigerant, such as butane, and the feed.

As a general rule, the solids content of the mixture fed from the chiller into the purification column is within the range of about 20 to about 50 weight percent, and preferably in the range of about 30 to about 40 weight percent. However, solids contents outside the stated ranges can be used.

The invention is applicable to the resolution of non-aqueous mixtures, an example of which being the separation of para-xylene from a mixture thereof with other xylene isomers and ethyl benzene. The invention is also applicable to the production of fresh water from brine, and to the concentration of aqueous solutions, examples of which include fruit juices, vegetable juices, and beverages.

The following examples are presented as further illustrations of the invention and are not to be construed unduly in limitation thereof.

*Example I*

Regular strength beer containing 3.5 weight percent alcohol is passed to chiller 14 via feed line 11 at the rate of 10,000 pounds per hour. The beer is cooled to a temperature of 26° F. in chiller 14 by evaporation of liquid propane in the chiller jacket. The slurry of ice crystals in liquid beer concentrate thus produced contains 40 weight percent ice crystals. The thick slurry passes into the crystal purification column from which is removed 5,992 pounds of beer concentrate containing 5.85 weight percent alcohol through mother liquor filter 25. This concentrate can be further concentrated by passage through one or more additional stages of crystallization The bed of ice crystals is melted at the end of the column by addition of electrical energy as shown in FIGURE 1 at the rate of 200 kilowatts. Water is removed from the column via line 34 at the rate of 4,008 pounds per hour as controlled by controller 54. The water has a purity of 99.8 percent and a temperature of 50° F. Thermocouple 53 transmits a signal to TRC 32 which manipulates the motor-actuated Powerstat 51 so as to vary the energy input to hold the temperature measured by thermocouple 53 at 50° F. When this temperature drops below 50° F., the energy input is increased while the energy input is decreased when the temperature rises above 50° F.

*Example II*

In the system set forth in Example I and utilizing the melter scheme of FIGURE 2 instead of the electrical heating element, the ice crystals are melted by circulating warm water through coil 55 at a rate of 120 gallons per minute. The water enters the heating coil at 70° F. and leaves at 55° F. Steam is condensed in heat exchanger 56 at the average rate of 133 pounds per minute, the rate being manipulated by TRC 58 in response to output of thermocouple 61 which it is desired to hold substantially constant at a value representative of 50° F. The other flow conditions are the same as set forth in Example I.

*Example III*

In the system set forth in Example I and utilizing direct heat exchanging instead of the electrical heating element, warm water is directly admitted into the end of the column at a temperature of 65° F. and at a rate of 120 gal./min. The water mixes with the melt and leaves with it. The other flow conditions are the same as set forth in Example I.

It has been discovered that the pulsations produced in the melt and the crystal bed by means of pulsation producing means 35 greatly increases the heat transfer coefficient for heating elements 33 and 55. This effect can be further enhanced by suspending heating element 33 or 55 in column 24 to take advantage of induced vibrations.

Reasonable variation and modification are possible within the scope of this disclosure without departing from the spirit and scope of this invention.

I claim:

1. In a process in which crystals and adhering mother liquor are continuously passed as a slurry from a chilling zone through a filtering zone from which a stream of mother liquor is withdrawn, the crystals and any remaining mother liquor are passed from said filtering zone into a reflux zone, the crystals are passed from said reflux zone into a melting zone, heat is introduced into said melting zone to melt the crystals to obtain a purified melt product, a portion of said purified melt product is withdrawn from the melting zone as a product stream, and the remainder of said purified melt product is passed countercurrently to the movement of crystals as reflux; the improvement comprising manipulating the rate of introduction of heat into said melting zone responsive to the temperature of said purified melt product in said melting zone to maintain said temperature of said purified melt product in said melting zone substantially constant, establishing a signal representative of the rate of flow of said product stream, and regulating responsive to said signal the rate of withdrawal of said product stream to maintain said rate of flow at a substantially constant rate.

2. In a process in which crystals and adhering mother liquor are continuously passed as a slurry from a chilling zone through a filtering zone from which a stream of mother liquor is withdrawn, the crystals and any remaining mother liquor are passed from said filtering zone into a reflux zone, the crystals are passed from said reflux zone into a melting zone, heat is introduced into said melting zone to melt the crystals to obtain a melt, a portion of the melt is withdrawn from the melting zone as a product stream, and the remainder of the melt is passed countercurrently to the movement of crystals as reflux; the improvement comprising establishing a signal representative of the temperature of said product stream, manipulating the rate of introduction of heat into said melting zone responsive to said signal to maintain said temperature of said product stream substantially constant, establishing a second signal representative of the rate of flow of said product stream, and regulating responsive to said second signal the rate of withdrawal of said product stream from said melting zone to maintain said rate of flow substantially constant.

3. A crystal purification apparatus comprising a purification column having a filtering section, a reflux section and a melting section; chilling means for converting the feed mixture into a slurry of crystals and mother liquor; means for introducing the feed mixture into the chilling means; means for passing the resulting slurry from said chilling means into said filtering section; means for introducing heat into said melting section; conduit means for withdrawing purified product from said melting section; a valve positioned in said conduit means; means operatively connected to said conduit means to establish a signal representative of the rate of flow of purified product through said conduit means; means for regulating said valve responsive to said signal to maintain said rate of flow of purified product at a substantially constant rate; means for measuring the temperature of said purified product; and means for controlling the means for introducing heat to vary the rate of introduction of heat into said melting section responsive to the thus measured temperature of the purified product to maintain said temperature of said purified product substantially constant.

4. Apparatus in accordance with claim 3 wherein said means for introducing heat comprises an electrical heating element disposed in heat exchanging relationship with said melting section, a source of electrical power, and a means for transferring electrical power from said source to said electrical heating element at a variable rate; and wherein said means for controlling comprises means for manipulating said means for transferring to vary the rate of transfer of electrical power from said source of electrical power to said electrical heating element responsive to said measured temperature of said purified product to maintain said temperature of said purified product substantially constant.

5. Apparatus in accordance with claim 4 wherein said means for transferring comprises a servo motor rotated variable power transferring device.

6. Apparatus in accordance with claim 3 wherein said means for introducing heat comprises an indirect fluid heat exchanging means which is positioned in heat exchanging relationship with said melting section.

7. A crystal purification apparatus comprising a purification column having a filtering section, a reflux section and a melting section; chilling means for converting the feed mixture into a slurry of crystals and mother liquor; means for introducing the feed mixture into the chilling means; means for passing the resulting slurry from said chilling means into said filtering section; an electrical heating element positioned inside said melting section and in heat exchanging relationship with the contents of said melting section; a source of electrical power; a variable power transferring device having an input and an output; a servo motor operatively connected to said variable power transferring device to vary the rate of transfer of power therethrough; means for connecting said source of electrical power to said input of said variable power transferring device; means for connecting said electrical heating element to said output of said variable power transferring device; a purified product withdrawal conduit connected in fluid communication with said melting section; a valve positioned in said conduit; an orifice positioned in said conduit; means for establishing a first signal representative of the pressure drop across said orifice; means for manipulating said valve responsive to said first signal to maintain the rate of withdrawal of purified product from said melting section substantially constant; a thermocouple positioned in said conduit and adapted to establish a second signal representative of the temperature of the purified product passing through said conduit; and means for actuating said servo motor responsive to said second signal to vary the rate of introduction of heat into said melting section to maintain said temperature of the purified product substantially constant.

8. A crystal purification apparatus comprising a purification column having a filtering section, a reflux section and a melting section; chilling means for converting said feed mixture into a slurry of crystals and mother liquor; means for introducing the feed mixture into the chilling means; means for passing the resulting slurry from said chilling means into said filtering section; an indirect heat exchange coil positioned inside said melting section and in heat exchanging relationship with the contents of said melting section; means for passing a first heating fluid through said heat exchange coil; means for controlling the rate of introduction of heat into said heat exchange coil; a purified product withdrawal conduit connected in fluid communication with said melting section; a valve positioned in said conduit; an orifice positioned in said conduit; means for establishing a first signal representative of the pressure drop across said orifice; means for manipulating said valve responsive to said first signal to maintain the rate of flow of purified product through said conduit substantially constant; a thermocouple positioned to measure the temperature of the purified product in said melting section and to establish a second signal representative of such measurement; and means for actuating said means for controlling to vary the rate of introduction of heat into said heat exchange coil responsive to said second signal to maintain said temperature of said purified product substantially constant.

9. Apparatus in accordance with claim 8 wherein said means for controlling comprises an indirect heat exchanger; conduit means for passing a second heating fluid through said indirect heat exchanger; means for passing said first heating fluid through said indirect heat exchanger in heat exchanging relationship with said second heating fluid; and a second valve operatively positioned in said conduit means; and wherein said means for actuating comprises means for actuating said second valve to control the rate of flow of said second heating fluid through said indirect heat exchanger responsive to said second signal.

References Cited by the Examiner
UNITED STATES PATENTS

| | | |
|---|---|---|
| 2,695,353 | 11/54 | Witschonke. |
| 2,721,969 | 10/55 | Van Ryan. |
| 2,854,494 | 9/58 | Thomas _____ 62—58 |
| 2,894,997 | 7/59 | Hachmuth. |
| 2,910,655 | 10/59 | Ludvigson. |

NORMAN YUDKOFF, *Primary Examiner.*